United States Patent [19]
Yanagisawa et al.

[11] Patent Number: 5,389,475
[45] Date of Patent: Feb. 14, 1995

[54] RECORDING MEDIUM AND INFORMATION-ERASING METHOD

[75] Inventors: Yoshihiro Yanagisawa; Hiroshi Matsuda, both of Isehara; Hisaaki Kawade, Yokohama; Etsuro Kishi, Kawasaki; Haruki Kawada, Yokohama; Hideyuki Kawagishi, Ayase; Kiyoshi Takimoto, Isehara; Yuko Morikawa, Yokohama; Toshihiko Takeda, Atsugi, all of Japan

[73] Assignee: Canon Kabushiki Kaisha, Tokyo, Japan

[21] Appl. No.: 900,313

[22] Filed: Jun. 18, 1992

[30] Foreign Application Priority Data
Jun. 21, 1991 [JP] Japan .................. 3-175856

[51] Int. Cl.6 ............................... G11B 9/00
[52] U.S. Cl. .................. 430/19; 430/495; 365/112; 252/306; 252/307; 369/126
[58] Field of Search .......... 430/19, 495; 365/112; 250/306, 307; 369/126, 275.2

[56] References Cited

U.S. PATENT DOCUMENTS

| | | | |
|---|---|---|---|
| 3,833,894 | 9/1974 | Aviram et al. | 340/173 R |
| 4,734,334 | 3/1988 | Matsushima et al. | 428/457 |
| 4,972,402 | 11/1990 | Miura et al. | 369/275.1 |
| 5,053,994 | 10/1991 | Bullington | 365/112 |
| 5,132,945 | 7/1992 | Osato et al. | 369/13 |
| 5,161,147 | 11/1992 | Goldberg et al. | 369/100 |
| 5,162,819 | 11/1992 | Sakai et al. | 365/112 |
| 5,204,851 | 4/1993 | Kawada et al. | 369/126 |
| 5,235,542 | 8/1993 | Hayashi et al. | 365/112 |

FOREIGN PATENT DOCUMENTS

| | | | |
|---|---|---|---|
| 0272935 | 6/1988 | European Pat. Off. | 369/126 |
| 0305033 | 3/1989 | European Pat. Off. | |
| 0327236 | 8/1989 | European Pat. Off. | |
| 0363147 | 4/1990 | European Pat. Off. | |
| 0412829 | 2/1991 | European Pat. Off. | |
| 0438256 | 7/1991 | European Pat. Off. | |
| 3638838 | 5/1988 | Germany | |
| 63-161552 | 7/1988 | Japan | |
| 2-050333 | 2/1990 | Japan | 369/126 |

OTHER PUBLICATIONS

Patent Abstracts of Japan, vol. 12, No. 259 (P-733)(3106) (Jul. 21, 1988), abstract of Japanese Patent Document No. 63-46639 (Feb. 27, 1988).
G. Binnig and H. Rohrer, *Scanning Tunneling Microscopy*, 55 Helvetica Physica Acta 726 (1982).

*Primary Examiner*—Charles L. Bowers, Jr.
*Assistant Examiner*—John A. McPherson
*Attorney, Agent, or Firm*—Fitzpatrick, Cella, Harper & Scinto

[57] ABSTRACT

A recording medium includes a substrate electrode, a recording layer constituted of a monomolecular film of an organic compound or a built-up film thereof, and a photoconductive thin film, laminated in this order on a substrate. The photoconductive thin film may preferably be divided to a plurality of isolated sectors. The recording medium is used in an ultra high density information processing apparatus with a probe electrode disposed close to the medium, a power source for applying a voltage between the medium and the probe electrode, and a light source for irradiating the medium.

13 Claims, 9 Drawing Sheets

RECORDING MEDIUM AND INFORMATION-ERASING METHOD

BACKGROUND OF THE INVENTION

1. Field of the Invention

The present invention relates to ultra-high density memory based on the principle of scanning tunneling microscope.

2. Related Background Art

In recent years, memory elements are used in the most important areas of electronic industry for producing computers, related devices thereof, video disks, digital audio disks, and so forth. Research and development of the memory elements are actively being conducted. Generally, memory elements are required to satisfy the items below:

(1) High density and large capacity of recording,
(2) High response speed of recording and reproduction,
(3) Small error rate,
(4) Low power consumption,
(5) High productivity and low cost, and so forth.

Heretofore, magnetic memories and semiconductor memories employing a magnetic material or a semiconductor are mainly used for memory devices. However, as the result of recent progress in laser technique, optical memory elements have come to be used which employ inexpensive high-density recording medium utilizing an organic thin film of an organic pigment, a photopolymer, or the like.

On the other hand, in recent years, scanning tunneling microscope (hereinafter referred to as "STM") has been practicalized which enables direct observation of the electronic structure of atoms on a surface of a conductor (G. Binnig, et al.: Helvetica Physica Acta 55, 526 (1982)). This technique enables measurement of real spatial images of materials, whether single crystalline or amorphous, at extremely high resolution with a low electric power without impairing the medium by current. Furthermore, the STM can be operated in the atmosphere. Therefore the STM is promising in a variety of application fields.

STM utilizes a tunnel current which flows, on application of voltage, between a metallic probe and an electroconductive substance placed as close as about 1 nm to each other. This tunnel current is highly sensitive to the change of the distance between the two. Accordingly, real spatial surface structure can be depicted and simultaneously various information on the entire electron cloud of the atoms on the surface can be read by scanning the surface with the probe so as to keep the tunnel current constant. In the observation, the resolution in the plane direction is about 1 Å, so that high-density recording and reproducing is achievable in precision of an order of atom size (several Å) by utilizing the principle of STM. In this recording-reproducing method, it is proposed that recording is conducted by changing the surface state of an appropriate recording layer with a high-energy electromagnetic wave such as a corpuscular beam (an electron beam or an ion beam) and an X-ray, or an energy beam such as visible ray and ultraviolet ray, and the reproducing is conducted by STM.

Another method of recording-reproducing is proposed in which a material exhibiting memory effect in current-voltage switching characteristics such as a thin film layer of a $\pi$-electronic organic compound, a chalcogenide, or the like is used as the recording layer in which recording and reproducing are conducted by STM (Japanese Patent Application Laid-Open No. Sho-63-161552). In this system, recording is made on a recording layer having electric memory effect by applying voltage directly by means of a probe electrode of STM, by switching the recording layer ideally in a unit size of an atomic order, whereby recording and reproducing is practicable in much higher density than that in optical recording.

The above-described recording-reproducing method requires detection of the position of the probe electrode in XY directions (on a plane of the recording medium) and control of correction of the position (namely, tracking) in order to record and reproduce a large quantity of information practically. In a method proposed, the tracking is conducted with high density and high precision by utilizing the atom arrangement in a substrate of a recording medium.

Separately, for simplification of the tracking, a proposed method is that guiding grooves (tracks) are provided preliminarily by forming projections and recesses on a substrate of a recording medium, and the probe electrode is moved by tracing the recessed portion or the projected portion of the track.

In the latter method, the track can be detected by the probe electrode in two ways: (1) the surface shape is recognized by controlling the distance between the probe electrode and the recording medium by giving feedback to a probe-height-controlling element so as to keep constant the current between the probe electrode and the recording medium in response to the change of the shape of the surface of the recording medium while the current is continuously measured; or (2) the surface shape is recognized by converting the current intensity to the distance between the probe electrode and the recording medium without using the above feedback.

In conventional recording-reproducing methods, particularly in such tracking as mentioned above, the track on the recording medium has been formed by mask vapor deposition or photolithography. In such methods of track formation, the fineness of the track pattern is limited. For example, the possible lower limit of the size thereof is about several ten $\mu$m in mask vapor deposition, and several tenth $\mu$m in photolithography. Therefore a desired high-density recording could not readily be achieved.

In erasing the recorded portion after practical recording and reproducing, according to the technique of the aforementioned electric memory effect, the probe electrode has to be made to access to the recorded bit and the recorded bit has to be switched to the original state individually. This requires enormous time when a wide range of information, for example, the entire of a recording layer or sector units of information is erased, which requires much time and makes difficult the high-speed response disadvantageously. Furthermore, in such technique, high controllability is required in voltage value and distance between the recording medium and the probe electrode. The deviation from the optimum conditions will cause insufficiency of erasing. Hence a recording medium and an erasing method are desired which do not require high controllability and enable simultaneous erasing of a number of bits.

SUMMARY OF THE INVENTION

An aspect of the present invention is to provide a recording medium comprising a substrate electrode, a recording layer provided on said electrode and constituted of a monomolecular film of an organic compound or a built-up film thereof, and a photoconductive thin film laminated on said recording layer.

Another aspect of the present invention is to provide a recording medium comprising a substrate electrode, a recording layer provided on said electrode and constituted of a monomolecular film of an organic compound of a built-up film thereof, and a photoconductive thin film laminated on said recording layer, said photoconductive thin film being divided to a plurality of isolated sectors.

Still another aspect of the present invention is to provide an information processing apparatus comprising a recording medium as described above, a probe electrode disposed close to said medium, a power source for applying a voltage between said medium and said probe electrode, and a light source for irradiating said medium.

Still another aspect of the present invention is to provide an information processing apparatus as described above, further comprising another power source for applying a voltage between said substrate electrode and said photoconductive thin film.

Still another aspect of the present invention is to provide an information erasing method for erasing information written in a recording medium as described above, comprising the steps of disposing said medium close to a probe electrode and as facing to a light source, and applying a voltage to said medium under light irradiation.

Still another aspect of the present invention is to provide an information erasing method for erasing information written in a recording medium comprising a substrate electrode, a recording layer provided thereon and constituted of a monomolecular film of an organic compound or a built-up film thereof, and a photoconductive thin film laminated on said recording layer, said photoconductive thin film being divided to a plurality of sectors, the information being written in a portion of said plurality of sectors, which method comprises a first step of disposing said medium close to a probe electrode and as facing to a light source, a second step of irradiating selectively said portion, and a third step of applying a voltage between said thin film and said probe electrode.

DESCRIPTION OF THE PREFERRED EMBODIMENT

The first recording medium of the present invention is described below.

Figure 1A:
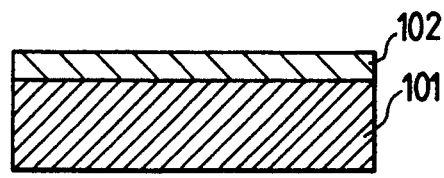
FIGS. 1A to 1D illustrate an example of the process for producing the first recording medium of the present invention.
Figure 1B:
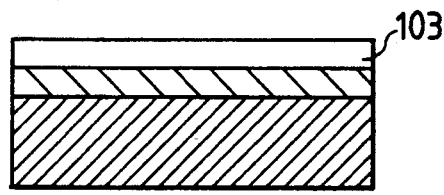
Figure 1C:
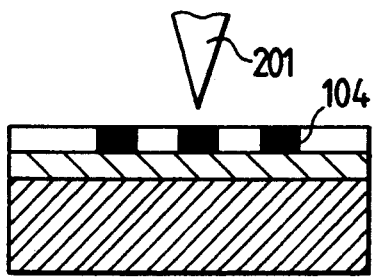
Figure 1D:
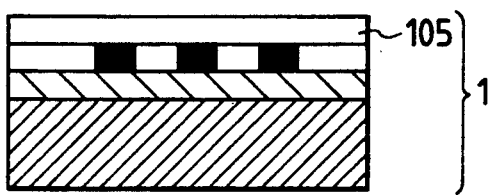

FIGS. 1A to 1D illustrate roughly the process of producing the recording medium of the present invention. A thin film of an electroconductive material as the substrate electrode 102 is formed on a substrate 101 (FIG. 1A). On this substrate electrode 102, a first recording layer 103 having electric memory effect is formed (FIG. 1B). Then the tracks 104 having a different electroconductivity are formed on the first recording layer 103 by application of voltage between the probe electrode 201 and the substrate electrode 102 (FIG. 1C). Finally, the second recording layer 105 having electric memory effect is deposited on the first recording layer, thus completing the recording medium 1 (FIG. 1D).

The first recording layer 103 and the second recording layer 105 develop known nonlinear current-voltage characteristics on flowing electric current directly between the probe electrode 201 and the substrate electrode 102 in a direction perpendicular to the film face by applying voltage therebetween, regardless of whether the first recording layer 103 only has been formed or both of the first and second recording layers 103 and 105 have been formed.

In the present invention, the direct flow of electric current from the probe electrode 201 to the first recording layer 103 gives difference of electroconductivity from that of the surrounding portion, and the portion having different electroconductivity is utilized as the track. The electroconductive portion can be formed on the recording layer with the probe electrode 201 in an extremely small size of 10 nm or less. Therefore, the recording density can be made higher than that of optical recording.

Accordingly, the principal features of the first recording medium of the present invention are as follows: (1) information is recorded and reproduced electrically on a recording medium with a probe electrode, so that the recording medium itself may be formed from a material of such light-fastness that cannot be used for an optical memory medium, and yet is superior in light-fastness and stability because the recording portion is not irradiated by light, and (2) the recording medium is capable of recording information in high density because it has a track and a recording point of extremely small size that cannot be obtained conventional optical memory.

The substrate 101 utilized for the first recording medium of the present invention, which is used for supporting the insulating organic compound layers as the first and second recording layers 103, 105 and the substrate electrode 102, may be made of any material provided that the surface thereof is flat. Practically, however, the available material is limited in a certain degree depending on the methods of formation of the insulating organic compound layers as the recording layers and the substrate electrode.

The substrate electrode 3 may be made of any material which has high electroconductivity: the material including metals and alloys such as of Au, Pt, Ag, Pd, Al, In, Sn, Pd, and W; graphite, silicide, electroconductive oxides such as ITO, and various other materials. From such a material, the electrode may be formed according to a known thin-film technique satisfactorily. The material is preferably an electroconductive material which gives no insulating oxide on the surface on formation of the recording layer. The preferred materials therefor are electroconductive oxides such as noble metals and ITO. The surface thereof is preferably made flat regardless of the material and the forming method of the film.

The useful material for the recording medium of the present invention include materials causing a memory-switching phenomenon in current-voltage characteristics (electric memory effect), such as organic monomolecular film of an organic compound possessing both a group having a E-electron level and a group having only a u-electron level in a molecule laminated on an electrode or an organic monomolecular built-up film thereof.

Since most of organic materials generally exhibit insulation or semi-insulation property, there are a great number of organic compounds having a group having a π-electron level useful in the present invention.

The suitable dyes having the x-electron system include dyes having a porphyrin skeleton such as phthalocyanine and tetraphenylporphyrin; azulene type dyes having a squarylium group or a croconic methine group as a linking chain; cyanine-analogous-dyes or cyanine dyes in which two nitrogen-containing heterocycles such as quinoline, benzothiazole, and bezoxazole are linked by a squalilium group of a croconic methine group; condensed polycyclic aromatic compounds such as anthracene and pyrene; chain compounds formed by polymerization of an aromatic cyclic compound or a heterocyclic compound; diacetylene polymers; derivatives of tetracyanoquinodimethane and tetrathiafulvalene, analogues and charge-transfer complex thereof; and metal complex compounds such as ferrocene and trisbipyridine-ruthenium complex.

The preferred high molecular materials for the present invention include condensed polymers such as polyimides and polyamides; and biopolymers such as bacteriorhodopsin.

The organic recording layer may be formed specifically by vapor deposition, a cluster-ion-beam method, or the like. However, the LB method is highly preferred among known techniques in view of controllability, ease, and reproducibility.

The group constituting the hydrophobic moiety includes generally known hydrophobic groups such as saturated and unsaturated hydrocarbon groups, condensed polycyclic aromatic groups, and linear polycyclic phenyl groups. Such a group or combination of the groups constitutes the hydrophobic moiety. On the other hand, the hydrophilic moiety is typically constituted of a hydrophilic group such as a carboxyl group, an ester group, an acidamido group, an imido group, a hydroxyl group, an amino group (primary, secondary, tertiary, and quaternary). One of the above groups individually or combination thereof constitutes the hydrophilic moiety of the above molecule.

An organic molecule, having the hydrophobic group and the hydrophilic group in good balance and having an appropriate size of a E-electron system is capable of forming a monomolecular film on a water surface, and is a highly suitable material in the present invention.

Specific examples are the molecules shown below.

A. Organic materials

[I] Croconic methine dyes:

1) 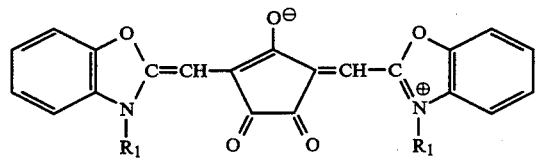

2) 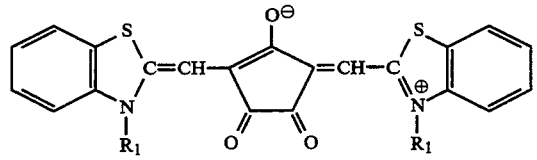

3) 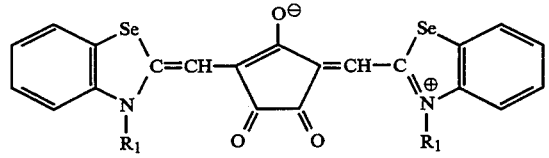

A. Organic materials
4) 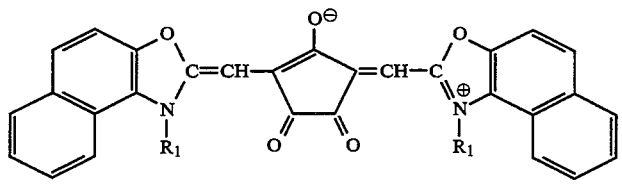
5) 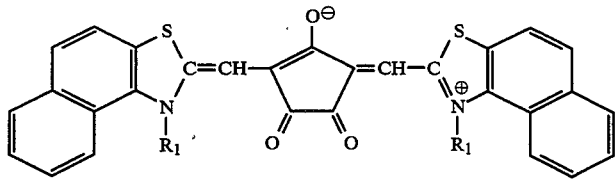
6) 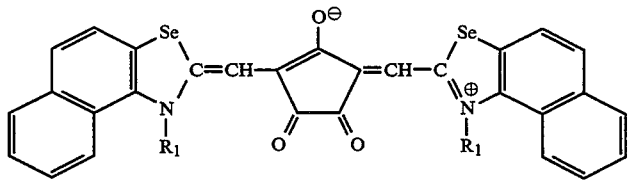
7) 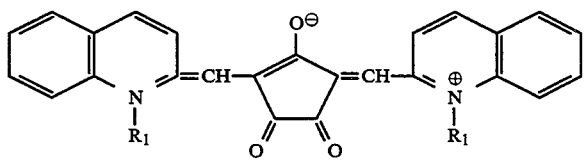
8) 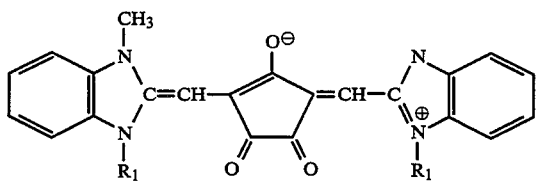
9) 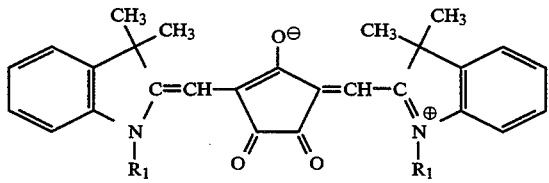
10) 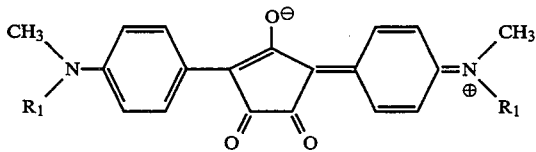
11) 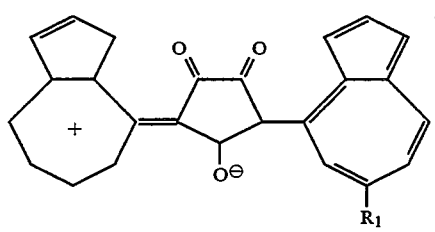
In the above formulas, $R_1$ is a long-chain alkyl group corresponding to the aforementioned group having a σ-electron level and being introduced to facilitate the formation of a monomolecular film on the water surface. The carbon number n of the alkyl is preferably in the range of $5 \leq n \leq 30$.

II] Squarylium dyes

The compounds mentioned in [I] above having the squarilium group of the structure below in place of the croconic methine group thereof.

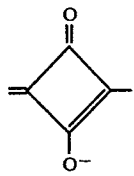

[III] Porphyrin type dye compounds

1)
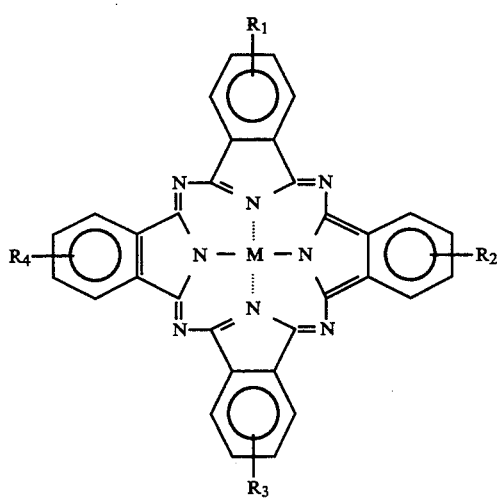

$R_1, R_2, R_3, R_4 = H, -O-\langle\bigcirc\rangle-, -O-CH_2-\underset{\underset{CH_3}{|}}{\overset{\overset{CH_3}{|}}{C}}-CH_3,$

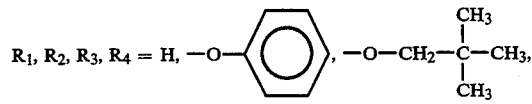

$-OC_5H_{11}, -C(CH_3)_3, -CH_2NHC_3H_7$ $M = H_2$, Cu, Ni, Al—Cl and a rare earth metal ion 2)
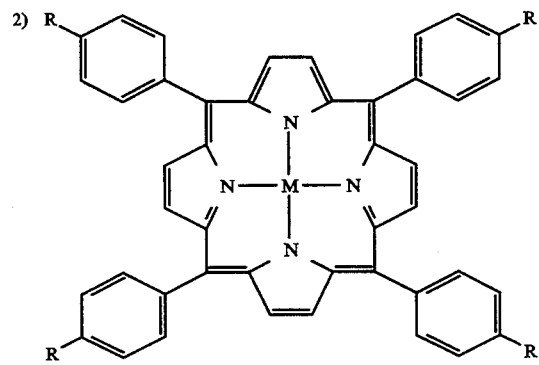

$R = OCH(COOH)C_nH_{2n+1}$  $5 \leq n \leq 25$ $M = H_2$, Cu, Ni, Zn, Al—Cl and a rare earth metal ion 3)
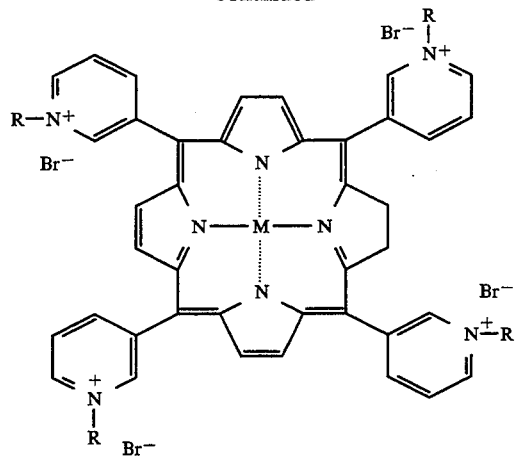

$R = C_nH_{2n+1}$  $5 \leq n \leq 25$
$M = H_2$, Cu, Ni, Zn, Al—Cl and a rare earth metal ion In the formulas, R is introduced to facilitate the formation of the monomolecular film, and is not limited to those mentioned above. $R_1$ to $R_4$, and R correspond to the aforementioned group having a σ-electron level.

[IV] Condensed polycyclic aromatic compounds

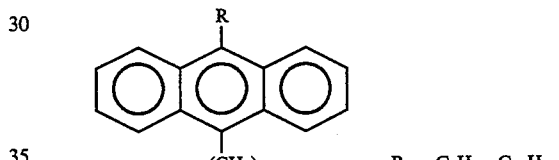

$R = C_4H_9 \sim C_{12}H_{25}$

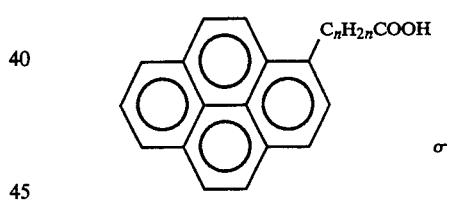

$\sigma \leq n \leq 20$

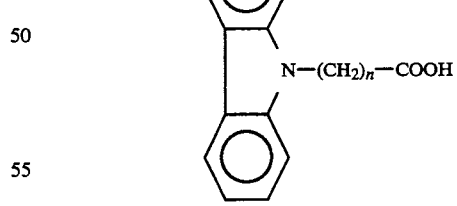

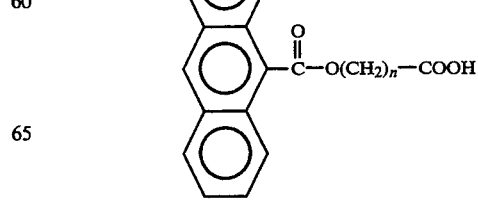

[V] Diacetylene compounds $$CH_3{\text{-}}(CH_2)_{\overline{n}}C{\equiv}C{\text{-}}C{\equiv}C{\text{-}}(CH_2)_{\overline{T}}X$$
$$0 \leq n, \ 1 \leq 20 \quad n + 1 > 10$$

In the formula, X is a hydrophilic group, usually —COOH, but may be —OH, —CONH$_2$ or the like.

[VI] Miscellaneous:

1) Quinque-thienyl

2) $CH_3(CH_2)_4$—⟨⟩—⟨⟩—⟨⟩—CN

3) Fe, R = CONHC$_{18}$H$_{37}$, OCOC$_{17}$H$_{35}$

4) Fe, with OCOC$_{17}$H$_{35}$ substituents

5) $\left( H_{45}C_{22}{\text{-}}N{\oplus}{\text{-}}{\text{-}}N \right)^+$ $\left( \begin{matrix} NC \\ NC \end{matrix} {=}{\text{⟨⟩}}{=} \begin{matrix} CN \\ CN \end{matrix} \right)^-$ 6) $\begin{matrix} NC \\ NC \end{matrix} {=}{\text{⟨⟩}}{=} \begin{matrix} CN \\ CN \end{matrix}$, R = C$_{18}$H$_{37}$ B. Organic polymer materials
[I] Addition polymers:
1) Polyacrylic acid $$\text{-}(CH{\text{-}}\underset{CO_2H}{\overset{R_1}{C}})_{\overline{m}}$$

2) Polyacrylate ester $$\text{-}(CH{\text{-}}\underset{CO_2R_5}{\overset{R_1}{C}})_{\overline{m}}$$

3) Acrylic acid copolymer $$\text{-}(CH{\text{-}}\underset{CO_2H}{\overset{R_1}{C}}{\text{-}}\underset{\underset{O}{\overset{\parallel}{C}}\text{-}O\text{-}\underset{O}{\overset{\parallel}{C}}}{C}{\text{-}}C)_{\overline{m}}$$

4) Acrylate ester copolymer $$\text{-}(CH{\text{-}}\underset{CO_2R_5}{\overset{R_1}{C}}{\text{-}}\underset{\underset{O}{\overset{\parallel}{C}}\text{-}O\text{-}\underset{O}{\overset{\parallel}{C}}}{C}{\text{-}}C)_{\overline{m}}$$

5) Polyvinyl acetate $$\left\{ \underset{\underset{OCOCH_3}{}}{CH}{\text{-}}{\overset{R_1}{CH}} \right\}_m$$

6) Vinyl acetate copolymer $$\left\{ \underset{OCOCH_3}{CH}{\text{-}}{\overset{R_1}{CH}}{\text{-}}\underset{\underset{O}{\overset{\parallel}{C}}\text{-}O\text{-}\underset{O}{\overset{\parallel}{C}}}{C}{\text{-}}C \right\}_m$$

[II] Condensation polymers
1) Polyimide

2) Polyamide

3) Polycarbonate $$\text{-}(OCO{\text{-}}\underset{}{\overset{R_1}{CH}}{\text{-}}CH_2)_{\overline{m}}$$

-continued

[III] Ring-opening polymerization products:
1) polyethylene oxide

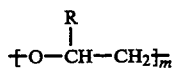

In the above formulas, $R_1$ is a long-chain alkyl group introduced to facilitate the formation of a monomolecular film on the water surface, and the carbon number n of the alkyl group is preferably in the range of $5 \leq n \leq 30$; $R_5$ is a short chain alkyl group, preferably of the carbon number n in the range of $1 \leq n \leq 4$; and the polymerization degree m is preferably in the range of $100 \leq m \leq 5000$.

The compounds listed above as specific examples show only basic structures. Naturally, substituted products of these compounds are also useful in the present invention.

In addition to the compounds above, any organic material and any organic polymer materials which are applicable to an LB method are naturally useful in the present invention. For example, biological materials (e.g., bacteriorhodopsin and cytochrome C) and synthetic polypeptides (PBLG), which are being investigated comprehensively, are also useful in the present invention.

The electric memory effect of these compounds having a $\pi$-electron level are observable in a film having a thickness of not more than several 10 $\mu$m. Since the probe electrode and the substrate electrode have to be brought close to each other so as to flow a tunnel current therebetween, which is used for recording and reproducing, the total thickness of the first and second recording layers of the present invention is in the range of from several tenths of one nm to 10 nm, preferably from several tenths of one nm to 3 nm.

The probe electrode 201 may be made from any electroconductive material: for example, Pt, Pt-It, W, Au, Ag, and the like. The probe electrode 201 is required to have a tip as sharp as possible in order to obtain high resolution in recording, reproducing, and erasing. In the present invention, the probe electrode 201 is prepared from needle-shaped electroconductive material by controlling the tip shape according to electropolishing. However, the method of preparation and the shape of the probe electrode 201 are not limited thereto.

The probe electrode 201 is not limited to be single. Two or more probe electrodes may be employed for separate use respectively for position detection, recording and reproducing.

The information-processing apparatus employing the recording medium of the present invention is explained by reference to the block diagram of FIG. 2. A probe electrode 201 applies voltage to a recording medium 1. Recording and reproducing are conducted by applying voltage from the probe electrode 201 to the first and second recording layer 103, 105.

The recording medium 1 is placed on an XY stage 202. A probe current amplifier 203 amplifies the probe current. A Z-direction driving circuit 204 controls a Z-direction fine-control mechanism 205 by using a piezoelectric element to maintain the height of the probe electrode 201 from the recording medium 1. A power source 206 is used for applying voltage for recording, reproducing and erasing between the probe electrode 201 and a substrate electrode 102.

An XY scan driving circuit 207 controls the movement of the probe electrode 201 with an XY-direction fine-movement control mechanism 208. A coarse movement mechanism 209 and a coarse movement driving circuit 210 are used for coarse control of the distance between the probe electrode 201 and the recording medium preliminarily so as to obtain a probe current of about $10^{-9}$ A, and displace the probe electrode 201 largely in XY direction relative to the recording medium (outside the working range of the fine control mechanism).

These devices are centrally-controlled by a microcomputer 211. A display 212 is provided to the apparatus.

The mechanical performances in the movement control by use of the piezoelectric element are shown below.

| | |
|---|---|
| Z-direction fine-control range: | 0.1 nm to 1 $\mu$m |
| Z-direction coarse control range: | 10 nm to 10 mm |
| XY-direction scanning range: | 0.1 nm to 1 $\mu$m |
| XY-direction coarse control range: | 10 nm to 10 mm |
| Tolerance in measurement and control: | |
| in fine control: | <0.1 nm |
| in coarse control: | <1 nm |

Secondly, the second recording medium of the present invention is described below.

Figure 6:
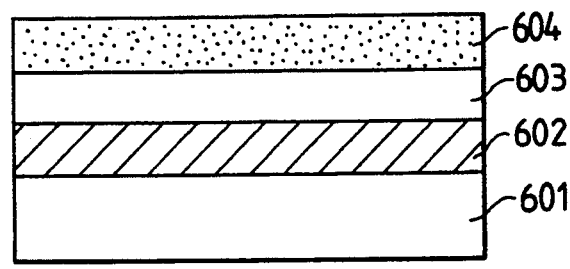
FIG. 6 illustrates an example of the constitution of the second recording medium of the present invention.

FIG. 6 illustrates an example of the second recording medium of the present invention. As shown in FIG. 6, a substrate electrode 602, a recording layer 603 composed of an organic compound exhibiting electric memory effect, and a photoconductive thin film 604 characteristic of the present invention are provided in the named order on a substrate 601. The photoconductive thin film 604 is made of a material which exhibits high electroconductivity on irradiation of light. While the substrate electrode 602 is provided on the substrate 601, the substrate itself may be utilized as the substrate electrode if the substrate is electroconductive.

The basic principle of recording, reproducing, and erasing by use of this recording medium is described below. For the recording and the reproducing a probe electrode is brought close enough to a recording medium to allow tunnel current to flow between the probe electrode and a substrate electrode, and recording voltage is applied between the probe electrode and the recording medium to change the electric properties of the recording medium to write information bits. After information is recorded as desired in the recording layer, reproducing voltage is applied to the probe electrode which is kept sufficiently close to the recording medium to allow tunnel current to flow, and the surface of the recording medium is scanned with the probe electrode kept close thereto, thus the change of the electric properties at the recorded bit portion being read by the change of the current detected by the probe electrode to reproduce the recorded information.

Figure 7:
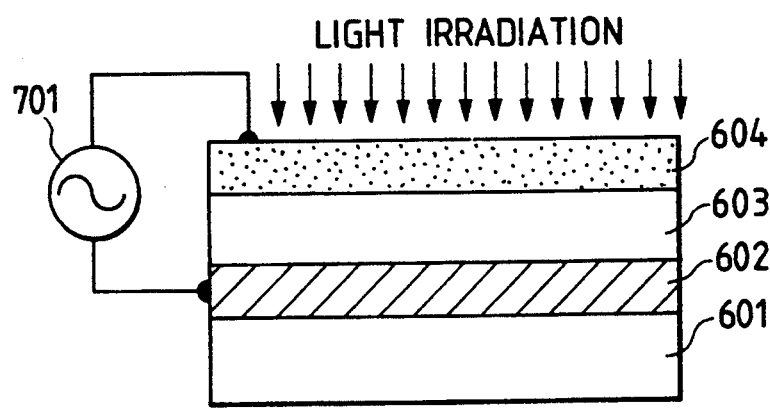
FIG. 7 illustrates a process of erasing on the second recording medium of the present invention.

The erasing process is explained by reference to FIG. 7. After information is recorded on the recording layer 603, light is projected onto the portion of the photoconductive thin film 604 on the recorded bit to be erased. (In FIG. 7, the entire face is irradiated by light.) Thereby, the electroconductivity of the photoconductive thin film 604 temporarily increases, giving apparently such constitution that the portion of the recording layer to be erased and irradiated with light is held between a pair of electrodes. When erasing voltage is applied between the photoconductive thin film 604 and the substrate electrode 602 from an erasing power source 701 simultaneously with the light projection, the erasing voltage is applied only to the light-projected portion of the recording layer, thereby all of the recorded bits in the light-projected region are erased. Thus by projection of light and application of erasing voltage to the region to be erased, a multiplicity of bits in the desired region can be simultaneously and readily erased. In the example in FIG. 7, the erasing power source 701 for applying the erasing voltage is connected to the photoconductive thin film 604 and the substrate electrode 602. However, the method of application of the erasing voltage is not limited thereto. Instead, for example, the erasing voltage may be applied from the probe electrode through the photoconductive thin film 604.

Figure 13:
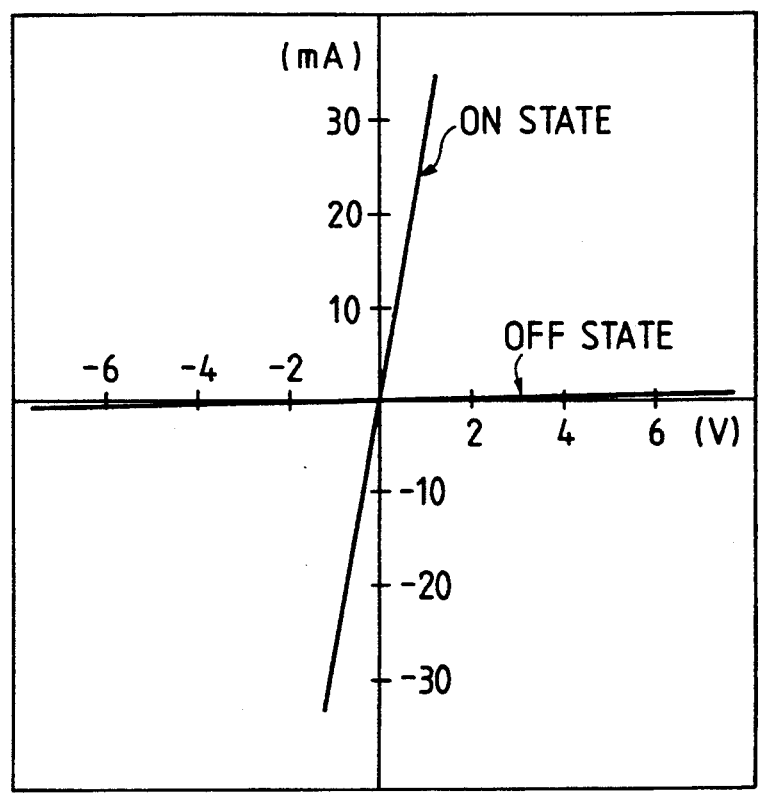
FIG. 13 explains electric memory effect.

The useful material for the recording medium of the present invention include materials causing a memory-switching phenomenon in current-voltage characteristics (electric memory effect), including organic monomolecular film of an organic compound comprising both a group having a $\pi$-electron level and a group only having a $\sigma$-electron level in a molecule laminated on an electrode or an organic monomolecular built-up film thereof. The electric memory effect enables reversible transition (or switching) between two or more electroconductive states (ON state and OFF state in FIG. 13), namely a low-resistance state (ON state) and a high-resistance state (OFF state) of a thin film such as the aforementioned organic monomolecular film or a built-up film thereof placed between a pair of electrodes by application of voltage exceeding a threshold value. The respective states can be retained (or memorized) without application of a voltage. In view of the erasing process characteristic of the present invention, a photoconductive material is not suitable for the material of the recording layer.

Since most of organic materials generally exhibit insulation or semi-insulation property, there are a great number of organic compounds which have a group having a $\pi$-electron level, yet have not photoconductivity, and are applicable in the present invention.

The recording layer may be formed specifically by vapor deposition, a cluster-ion-beam method, or the like. However, the LB method is highly preferred among known techniques in view of controllability, ease, and reproducibility.

The LB method enables ready formation of a monomolecular or monomolecular built-up film of an organic compound having a hydrophobic moiety and a hydrophilic moiety in a molecule, thereby enabling steady supply of uniform organic ultra-thin films having a thickness of a molecular order over a large area.

The LB method enables formation of a monomolecular film or a monomolecular built-up film of a molecule, which has a hydrophilic moiety and a hydrophobic moiety in good balance thereof in the molecule, by utilizing the phenomenon that the molecules form a monomolecular layer on the water surface with the hydrophilic group orienting downward.

From the above, suitable materials specifically include organic materials such as croconic methine dyes and organic polymer materials such as polyimides and other condensation polymers. Naturally, substitution products of these compounds are also suitable for use in the present invention.

Organic materials and organic polymer materials other than those mentioned above, which are suitable for the LB method are naturally also useful in the present invention. For example, biological materials such as bacteriorhodopsin and cytochrome C which are being investigated comprehensively are applicable in the present invention.

The photoconductive thin film used in the present invention, through which tunnel current is made to flow between the probe electrode and the substrate electrode on recording and reproducing, is required to be sufficiently thin to allow the flow of tunnel current and required to be uniform. The material for the photoconductive thin film includes inorganic semiconductor materials such as Si, GaAs, CdSe, CdS, and ZnS, which are typical photoconductive materials, and further includes a variety of photoconductive organic compounds which have high freedom in material design. The photoconductive thin film can be formed by a known thin film forming method such as ordinary vapor deposition, molecular beam epitaxy, sputtering, and coating to achieve the object of the present invention.

The thin film in preferred embodiment of the present invention, however, is constituted of a monomolecular film or a monomolecular built-up film of an organic compound which has both a hydrophilic moiety and a hydrophobic moiety and has photoconductivity. Such monomolecular films and monomolecular built-up films are very convenient for use in the present invention because of the ease of ultra-thin film formation with high regularity and uniformity without defect. The organic compound includes specifically known organic dyes having both hydrophilic moiety and a hydrophobic moiety. The preferred dyes are cyanine dyes, ferrocyanine dyes, phthalocyanine dyes, triphenylmethane dyes, azulene dyes, and the like. Further, biological materials such as chlorophyll, rhodamine, cytochrome, and the like are also applicable.

A further method of forming the photoconductive organic thin film layer is the aforementioned LB method. As described above, the thin film is frequently required to be as thin as several ten Å or less and be uniform, which is readily achievable by the LB method.

The thicknesses of the recording layer and the photoconductive thin film in the present invention are mentioned below. The electric memory effect of these compounds having a $\pi$-electron level are observable at a film thickness of not more than several 10 $\mu$m. Since the probe electrode and the substrate electrode have to be brought close to each other so as to allow tunnel current to flow therebetween, the total thickness of the recording layer and the photoconductive thin film is preferably in the range of from 5 Å to 100 Å, more preferably from 5 Å to 30 Å.

The substrate for supporting the thin film formed by lamination of the aforementioned organic material, in the present invention, may be made of any material provided that it has a flat surface. Useful material includes metals, glass, ceramics, plastics, and the like. Furthermore, biological material having very low heat resistance may be used.

The substrate electrode may be made of any material which has high electroconductivity: the material including metals and alloys such as of Au, Pt, Ag, Pd, A1, In, Sn, Pd, and W; graphite, silicide, electroconductive oxides such as ITO, and various other materials. From such a material, the electrode may be formed according to a known thin-film technique satisfactorily. The material is preferably an electroconductive material which gives no insulating oxide on the surface on formation of the recording layer. The preferred materials therefor are noble metals and electroconductive oxides such as ITO. The surface thereof is preferably made flat regardless of the material of the film.

The probe electrode may be made from any electroconductive material: for example, Pt, Pt-Ir, W, Au, Ag, and the like. The probe electrode is required to have a tip as sharp as possible in order to obtain high resolution in recording, reproducing, and erasing. In the present invention, the probe electrode is prepared from needle-shaped electroconductive material by controlling the tip shape according to electropolishing. However, the method of preparation and the shape of the probe electrode are not limited thereto.

The probe electrode is not limited to be single. Two or more probe electrodes may be employed for separate use respectively, for example, for position detection, recording and reproducing.

The second recording medium of the present invention and the process of erasing therewith are explained by reference to the block diagram of an information-processing apparatus in FIG. 8. A probe electrode 806 applies voltage to a recording medium. Recording and reproducing are conducted by applying voltage from the probe electrode to a recording layer 603. Erasing is conducted by projecting light from a light-projection device 80? to a portion to be erased of the recording medium and simultaneously applying erasing voltage by the probe electrode 806.

The recording medium to be subjected to the processing is placed on an XY stage 814. A bias power source combined with a probe current amplifier 812 applies bias voltage and amplifies the probe current. A servo circuit 811 controls a fine movement mechanism 809 employing a piezoelectric element so as to maintain constant the height of the probe electrode for reading probe current. A power source 813 applies pulse voltage for recording and erasing between the probe electrode 806 and the substrate electrode 602.

Since the probe current changes abruptly on application of pulse voltage, the servo circuit 811 controls a HOLD circuit to be ON during that time to maintain the output voltage constant.

An XY fine movement control mechanism 808 and an XY scan-driving circuit 810 control the movement of the probe electrode 806 in X- and Y-directions. A coarse movement control circuit 816 and a coarse movement mechanism 815 are used for coarse control of the distance between the probe electrode 806 and the recording medium preliminarily so as to obtain a probe current of about $10^{-9}$ A, and displace the probe electrode largely in X- and Y-directions relative to the recording medium (outside the working range of the fine control mechanism).

These devices are centrally-controlled by a microcomputer 817. A display 818 is provided to the apparatus.

The mechanical performances in the movement control by use of the piezoelectric element are shown below.

| | |
|---|---|
| Z-direction fine-control range: | 0.1 nm to 1 μm |

-continued

| | |
|---|---|
| Z-direction coarse control range: | 10 nm to 10 mm |
| XY-direction scanning range: | 0.1 nm to 1 μm |
| XY-direction coarse control range: | 10 nm to 10 mm |
| Tolerance in measurement and control: | |
| in fine control: | <0.1 nm |
| in coarse control: | <1 nm |

With the second recording medium of the present invention, recorded bits are erased such that the recording medium is irradiated locally or totally to increase the electroconductivity of the photoconductive thin film temporarily at the region where recorded information is to be erased and voltage is applied to the recording medium from the probe electrode through the thin film, so that recorded information over a broad range on the recording medium can simultaneously and readily be erased as desired.

Figure 10:
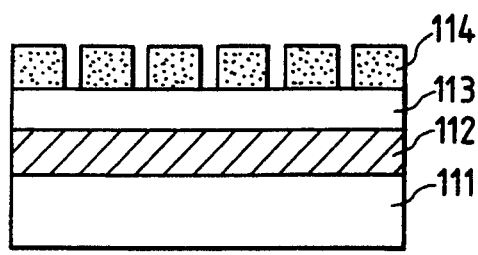
FIG. 10 illustrates an example of the constitution of the third recording medium of the present invention.

FIG. 10 illustrates an example of the third recording medium of the present invention. As shown in FIG. 10, a substrate electrode 112, a recording layer 113 composed of an organic compound having electric memory effect, a photoconductive layer 114 which is characteristic of the present invention are provided in the named order on a substrate 111. The photoconductive layer 114 which is made of a material giving high electroconductivity on irradiation of light is formed in separate portions in a desired size and desired positions, serving as sectors. While the substrate electrode 112 is provided above on the substrate 111 in the above example, the substrate itself may be utilized as the substrate electrode instead if the substrate is electroconductive.

The basic principle of recording, reproducing, and erasing in the present invention is described below. For the recording and the reproducing, a probe electrode is brought close sufficiently to a recording medium to allow tunnel current to flow between the probe electrode and a substrate electrode, and recording voltage is applied between the probe electrode and the recording medium to change the electric properties of the recording medium to write information bits. After information is recorded as desired in the recording layer, reproducing voltage is applied to the probe electrode which is kept sufficiently close to the recording medium to allow tunnel current to flow, and the surface of the recording medium is scanned with the probe electrode kept close thereto, thus the change of the electric properties at the recorded bit portion being read by the change of the current detected by the probe electrode to reproduce the recorded information.

Figure 11:
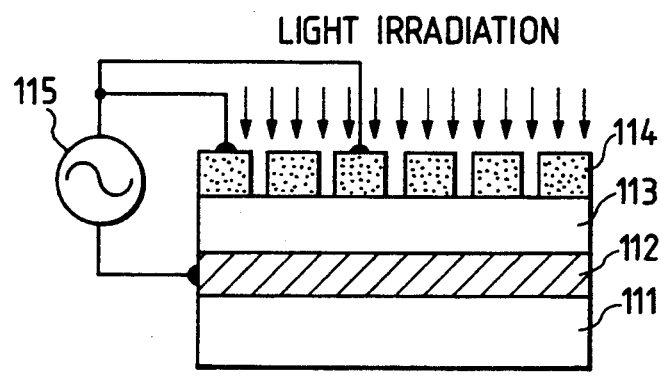
FIG. 11 illustrates a process of erasing on the third recording medium of the present invention.

The erasing process of the present invention is described by reference to FIG. 11. After information is recorded on the recording layer 113, light is projected to the sector-containing regions to be erased of the photoconductive layer 114. (In FIG. 11, the entire face is irradiated by light.) Thereby, the electroconductivity of the photoconductive layer 114 is temporarily increased, giving apparently such constitution that only the portions of the recording layer irradiated with light are held between pairs of electrodes. When erasing voltage is applied between the sectors to be erased of the photoconductive layer and the substrate electrode 112 from an erasing power source 115 simultaneously with the light projection, the erasing voltage is applied only to the light-projected portion of the recording layer, thereby all of the recorded bits in the light-projected region are erased. Thus by projection of light and application of erasing voltage to the regions having sectors to be erased, a multiplicity of bits in the desired sectors can be simultaneously and readily erased. In the example of FIG. 11, the erasing power source 115 for applying the erasing voltage is connected to the photoconductive layer 114 and the substrate electrode 112. However, the method of application of the erasing voltage is not limited thereto. Instead, for example, the erasing voltage may be applied from the probe electrode through the photoconductive layer 114.

In the third recording medium of the present invention, the material, the forming process, and the shape of the recording layer, the photoconductive layer and the probe electrode employed therefor are the same as those in the second recording medium of the present invention.

The third recording medium of the present invention and the process of erasing therewith are explained by reference to the block diagram of an information-processing apparatus in FIG. 12. A probe electrode 116 applies voltage to a recording medium. Recording and reproducing are conducted by applying voltage from the probe electrode to a recording layer 113. Erasing is conducted by projecting light from a light-projection device 117 to sectors at portions to be erased of the recording medium and simultaneously applying erasing voltage by the probe electrode 116.

The recording medium to be subjected to the processing is placed on an XY stage 124. A bias power source combined with a probe current amplifier 122 applies bias voltage and amplifies the probe current. A servo circuit 121 controls a fine movement mechanism 119 employing a piezoelectric element so as to maintain constant the height of the probe electrode for reading probe current. A power source 123 applies pulse voltage for recording and erasing between the probe electrode 116 and the substrate electrode 112.

Since the probe current changes abruptly on application of pulse voltage, the servo circuit 121 controls a HOLD circuit to be ON during that time to maintain the output voltage constant.

An XY fine movement control mechanism 118 and an XY scan-driving circuit 120 control the movement of the probe electrode 116 in X- and Y-directions. A coarse movement control circuit 125 and a coarse movement mechanism 126 are used for coarse control of the distance between the probe electrode 116 and the recording medium preliminarily so as to obtain a probe current of about $10^{-9}$ A, and displace the probe electrode largely in X- and Y-directions relative to the recording medium (outside the working range of the fine movement control mechanism).

These devices are centrally-controlled by a microcomputer 127. A display 128 is provided to the apparatus.

The mechanical performances in the movement control by use of the piezoelectric element are shown below.

| | |
|---|---|
| Z-direction fine-control range: | 0.1 nm to 1 μm |
| Z-direction coarse control range: | 10 nm to 10 mm |
| XY-direction scanning range: | 0.1 nm to 1 μm |
| XY-direction coarse control range: | 10 nm to 10 mm |
| Tolerance in measurement and control: | |
| in fine control: | <0.1 nm |
| in coarse control: | <1 nm |

The third recording medium of the present invention has sectors formed by laminating separated portions of a photoconductive layer on a recording layer, and the recorded bits therein are erased collectively by projecting light to separated sectors of the photoconductive layer to increase temporarily the electroconductivity of the desired sectors of the photoconductive layer and simultaneously applying voltage there from a probe electrode through the photoconductive layer. Accordingly, recorded information on regions over a broad area on the recording medium can be simultaneously and readily erased as desired. Since the light may be projected to the entire face of the recording medium, light projection need not positionally be controlled precisely, and collective erasing can be conducted simply over a broad area.

The present invention is described more specifically by reference to Examples.

Example 1

An optically polished glass substrate (Substrate 101) was washed with a neutral detergent and trichloroethylene. On this substrate, a CF layer was formed as a subbing layer. Thereon, Au was laminated in a thickness of 100 nm by vacuum vapor deposition as the substrate electrode 102. Further thereon, an LB film of squarylium-bis-6-octylazulene dye (hereinafter referred to as "SOAZ") was formed as the first recording layer 103. The procedure of the LB film formation is described below.

A solution of SOAZ in chloroform at a concentration of 0.2 mg/ml was developed over a water surface at 20° C. to form a monomolecular film on the water surface. After evaporation of the solvent, the surface pressure of the monomolecular film was raised to 20 mN/m. Then, with the surface pressure kept constant, the above substrate was immersed slowly into the water so as to traverse the water surface at a rate of 5 mm/min, and was pulled out at the same rate. This procedure was repeated again. Thus a four-layered Y-type monomolecular built-up film was formed as the first recording layer 103.

Subsequently, in this first recording layer, tracks 104 were provided by forming the portions having a different electroconductivity in a size of 0.5 mm long and 0.01 μm wide at a pitch of 0.02 μm in a region of 0.5 mm×0.5 mm. The procedure is described below.

Figure 2:
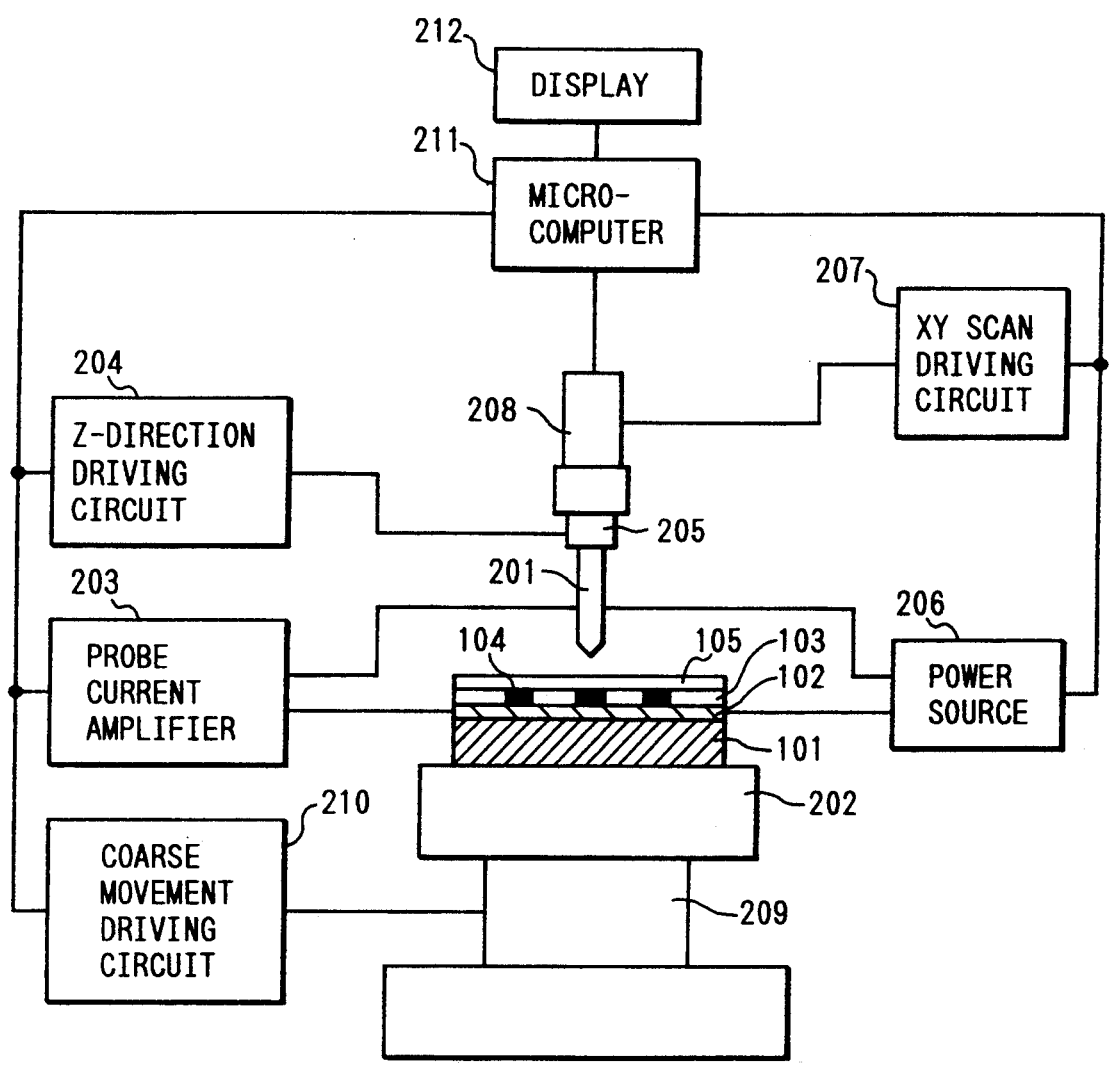
FIG. 2 is a block diagram of the constitution of an information-processing apparatus employing the first recording medium of the present invention.
Figure 3:
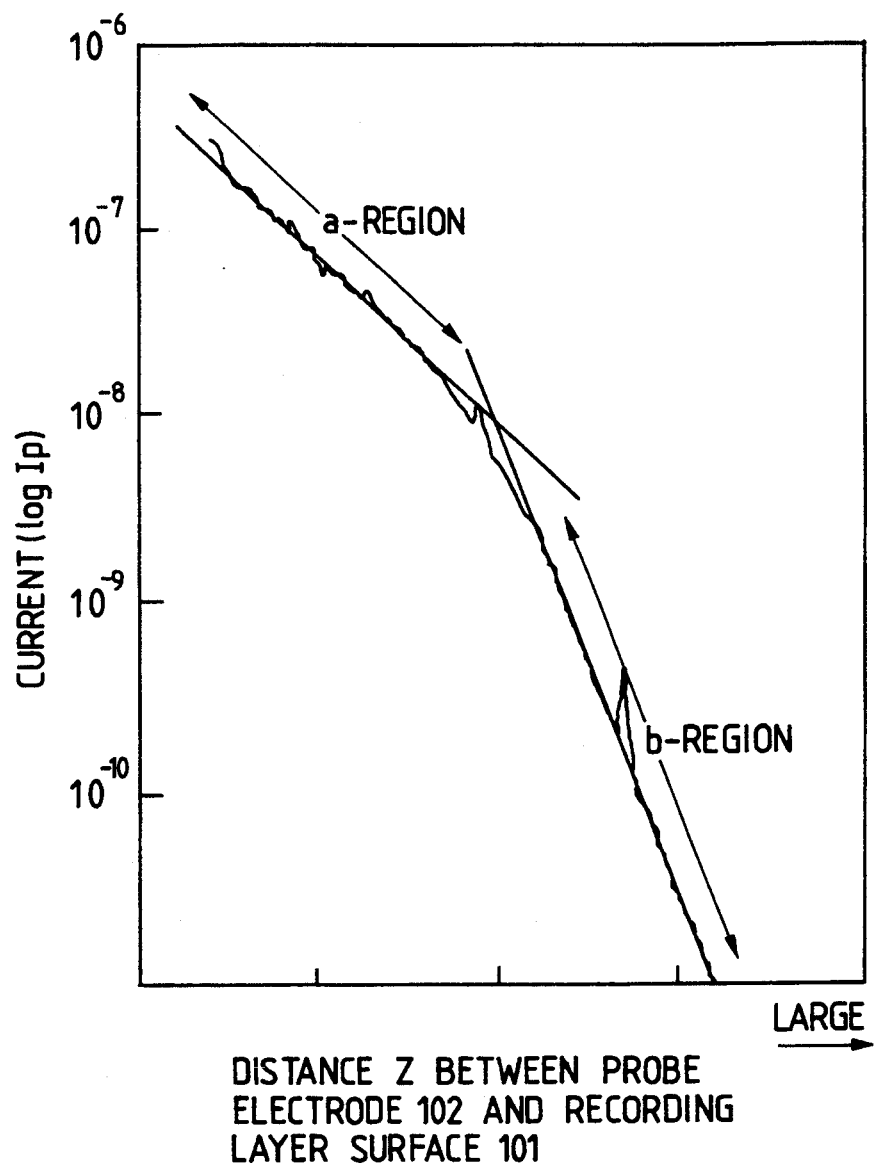
FIG. 3 is a graph showing the dependency of the electric current on the distance between the surface of the recording medium and the probe electrode in the first recording medium of the present invention.
Figure 4:
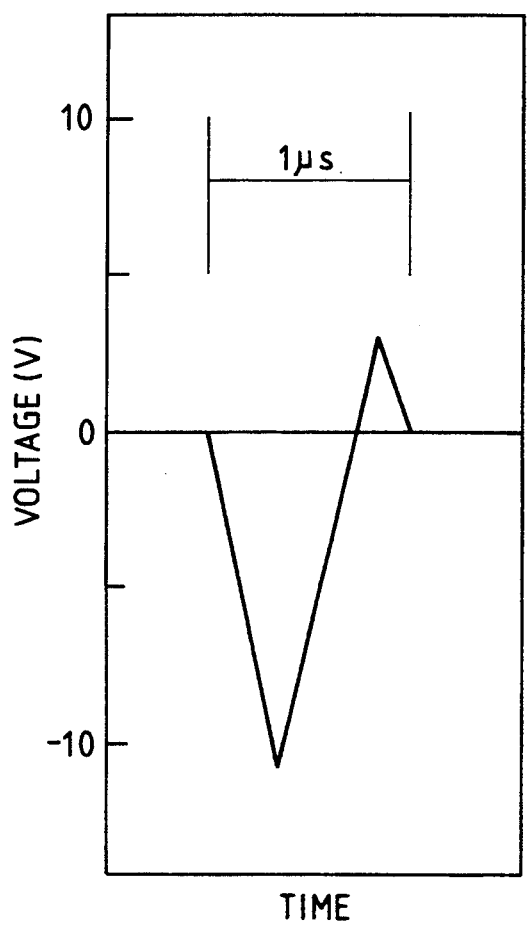
FIG. 4 shows the wave shape of the pulse signal employed in the recording on the first recording medium of the present invention.

The tracks were formed by using the information-processing apparatus shown in FIG. 2. The probe electrode 201 employed was shaped from platinum/rhodium by electropolishing. This probe electrode 201 is useful directly for recording, reproducing and erasing. The distance (Z) between the probe electrode 201 and the first recording layer 103 is controlled by application of appropriate voltage from a Z-direction driving circuit 204 to a Z-direction fine movement control mechanism 205. With this function maintained, an XY direction fine movement control mechanism 208 is controlled by an XY-scan driving circuit 207 to control the movement of the probe electrode 201 in an XY plane direction. A recording medium 1 is placed on an XY stage 202 of high precision, and is movable to any desired position by a coarse movement mechanism 209 by application of appropriate voltage from a coarse driving circuit 210. With these movement control mechanisms, the probe electrode 201 is capable of recording, reproducing, and erasing at any position on the recording layer on the substrate. The substrate having the aforementioned first recording layer 103 was set on the information-processing apparatus, and the distance (Z) between the probe electrode 201 and the substrate electrode 102 was adjusted by applying voltage of −1.0V to the probe electrode 201 relative to the substrate electrode 102 and monitoring the current flowing in the first recording layer 103. Then, by changing the distance between the probe electrode 201 and the surface of the first recording layer 103 by use of the Z-direction fine-movement control mechanism 205, the electric current characteristics were obtained as shown in FIG. 3. The distance Z between the probe electrode 201 and the surface of the recording layer can be adjusted by changing the probe current and the probe voltage. In order to keep the distance Z constant at an appropriate value, the probe voltage needs to be adjusted so as to give the probe current $I_p$ in the range of $10^{-7} A \geq I_p \geq 10^{-12}$ A, preferably $10^{-8} A \geq I_p \geq 10^{-10}$ A. In this Example, the distance between the probe electrode 201 and the surface of the first recording layer 103 was controlled by setting the probe current $I_p$ at $10^{-9}$A at the probe voltage of 0.5V (corresponding to the b region in FIG. 3). The desired tracks were formed in the first recording layer 103 in such a manner that the probe electrode 201 was made to scan the first recording layer 103 slowly with the distance Z maintained constant and with applying continuously triangle pulse voltages in a wave form shown in FIG. 4 which is larger than the threshold voltage $V_{th-ON}$ to write the ON state.

Finally, on the first recording layer, a second recording layer was formed composed of four layers of SOAZ in the same manner as the first recording layer 105, thus the recording medium being completed.

Recording, reproducing, and erasing were conducted as below by use of the recording medium prepared above. The probe electrode 201 was made to scan along the tracks 104, and information was recorded at a pitch of 20 nm. The tracking can be practiced with the Z-direction driving circuit 204 kept at a constant output voltage (HOLD circuit being ON) or with the Z-direction driving circuit 204 operated (HOLD circuit being OFF). In the tracking, the tracks were recognized by increase of the probe current by a factor of ten or more when the output voltage of the Z-direction driving circuit 204 is kept constant (HOLD circuit being ON), or otherwise by increase of the output voltage of the Z-direction driving circuit 204 by 1V or more when the Z-direction driving circuit is operated (HOLD circuit being OFF). In such information recording, the ON state was written by application of pulse voltage of larger than the threshold voltage $V_{th-ON}$ in a wave form similar to that in FIG. 4. On application of the pulse voltage, the output voltage of the Z-direction driving circuit 204 was kept constant.

The written information can be read, while the distance between the probe electrode 201 and the surface of the recording medium 1 is controlled under the same conditions in writing, by scanning of the probe electrode 201 with the output of the Z-direction driving circuit 204 being kept constant and reading directly the change of the probe current between an ON state region and an OFF state region. Otherwise, the written information can be read by scanning of the probe electrode 201 with the Z-direction driving circuit 204 kept operating (HOLD circuit being OFF) and reading the change of the output voltage of the Z-direction driving control mechanism 205 between an ON state region and an OFF state region. In this Example, the probe current at the ON state region was confirmed to have changed by a factor of 1000 or more in comparison with that before the recording (or of the OFF state region). The recorded ON state region could readily be discriminated from the track 104 by the facts that the electroconductivity of the film at the portion of the track in the perpendicular direction is intermediate between the value at the recorded ON state portion and the value at the non-recorded portion, and track 104 is formed linearly but the recorded portion is in a form of a dot.

Figure 5:
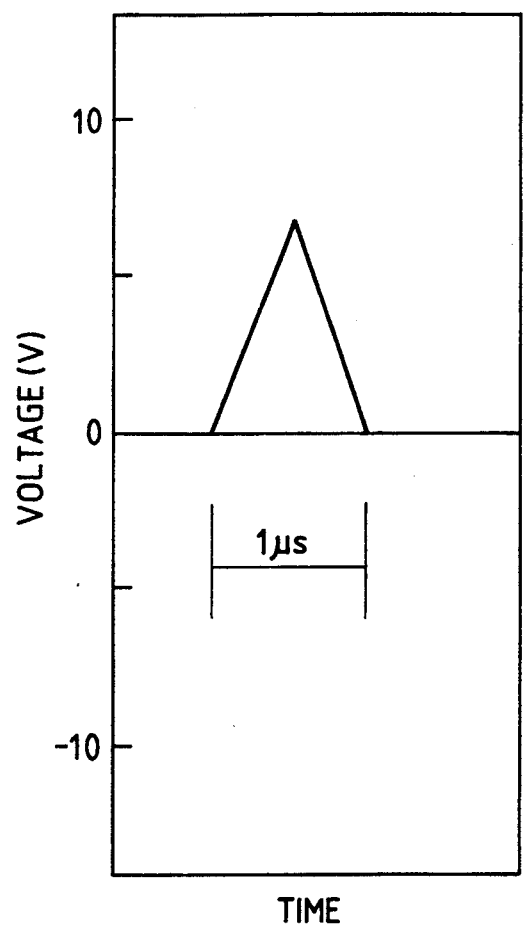
FIG. 5 shows the wave shape of the pulse signal employed in the erasing on the first recording medium of the present invention.

Erasing was practiced as below. The distance between the probe electrode 201 and the surface of the recording medium 1 was controlled under the same conditions as in writing, and the output of the Z-direction driving circuit 204 was maintained constant. The voltage between the probe electrode 201 and the substrate electrode 102 was fixed at 8V which is more than the $V_{th-OFF}$ as shown in FIG. 5. In this state, the probe electrode 201 was made to scan slowly to trace the recorded positions. Consequently, it was confirmed that the recorded state was entirely erased to turn into an OFF state. In the above reproducing experiment, the bit error rate was $3 \times 10^{-6}$.

Example 2

A recording medium 1 was prepared in the same manner as in Example 1 except that the first recording layer 103 was formed as a four-layered polyimide film (hereinafter referred to as "PI") by an LB method.

On a glass substrate (Substrate 101) having been washed, a substrate electrode 102 was formed in the same manner as in Example 1. Separately, a solution of polyamic acid (hereinafter referred to as PA) in a mixture of dimethyacetamide and benzene at a repeating unit concentration of 1.0 mmol/Ω was developed on a surface of water at 20° C. After evaporation of the solvent, a monomolecular film was formed on the water surface by raising the surface pressure thereof to 25 mN/m. Then, with the surface pressure kept constant, the above substrate was immersed slowly into the water so as to traverse the water surface at a rate of 5 mm/min, and was pulled out at the same rate. This procedure was repeated again. Thus a four-layered Y-type monomolecular built-up film was formed. The substrate having the built-up film was heat-treated at 300° C. for 10 minutes to imidate the PA built-up film into a PI thin film as the first recording layer 103. On the first recording layer 103, tracks 104 were formed in the same manner as in Example 1. Finally, in the first recording layer, a four-layered SOAZ film was formed as the second recording layer 105. Thus the recording medium 1 was completed.

With the recording medium 1 prepared above, recording, reproducing, and erasing was practiced in the same manner as in Example 1. The bit error rate was $5 \times 10^{-6}$. Erasing could be conducted.

Example 3

With a recording medium prepared in the same manner as in Example 1, recording and reproducing were conducted in the same manner as in Example 1 except that the information was written just on the track at a pitch of 10 nm. As the result, the bit error rate was $5 \times 10^{-6}$.

Example 4

On a substrate having an LB film of PI and an LB film of SOAZ formed in the same manner as in Example 1, a film of polyisobutyl methacrylate (PIBM) was formed further thereon in a manner as described below to complete a recording medium. Firstly the substrate having the formed SOAZ film was immersed into water so as to traverse the surface of pure water. Then, a solution of PIBM in chloroform at a concentration of $1 \times 10^{-3}$M was developed on the surface of pure water at 20° C. After evaporation of the solvent from the water surface, the surface pressure was raised to 11 mN/m to form a monomolecular film on the water surface. With this surface pressure kept constant, the substrate was pulled out so as to traverse the monomolecular film on the water surface at a rate of 5 cm/min to form one layer of a laminated film.

The resulting recording medium was subjected to the tests of recording, reproducing, and erasing in the same manner as in Example 1. The result was better than that of Example 1. The bit error rate was $1 \times 10^{-6}$.

The recording mediums having been subjected to the tests of recording, reproducing, and erasing in this Example and Example 1 were compared by observation of molecular arrangement in the SOAZ built-up layer by means of a scanning tunnel microscope. Disorder of the molecular arrangement was observed in portions of the SOAZ built-up layer of the recording medium of Example 1, while no disorder was observed in the SOAZ built-up layer used in this Example.

In Examples above, tracks were formed by causing difference of electroconductivity by means of the probe electrode. However, the technique of track formation is not limited thereto. Any procedure may be applicable which causes the difference of electroconductivity. An example therefor is a local doping on a semiconductive substrate. While the tracks had higher electroconductivity than adjacent portions in Examples above, the tracks may have lower electroconductivity conversely. Further, while in Examples above, the tracks were linear, the shape of the track is not limited thereto. A spiral shape, a circular shape, and other shapes may also be employed similarly. Furthermore, the recording layer was formed in Examples above by an LB method. However, any method may be applicable which enables formation of an extremely thin and uniform film, specifically including MBE, and CVD. The material and the shape of the substrate are not limited in the present invention. Further, while the probe was single in Examples above, two or more probes may be used for separate use for recording-reproducing and tracking.

Example 5

An optically polished glass substrate (Substrate 601) was washed with a neutral detergent, and trichloroethylene. On this substrate, Cr was deposited in a thickness of 30 Å as a subbing layer by vacuum vapor deposition (resistance heating). Thereon, Au was deposited in a thickness of 1000 Å as the substrate electrode 602 by the same method.

Separately, a solution of SOAZ in chloroform at a concentration of 0.2 mg/ml was developed over a water surface at 20° C. to form a monomolecular film on the water surface. After evaporation of the solvent, the surface pressure of the monomolecular film was raised to 20 mN/m. Then, with the surface pressure kept constant, the above substrate having the substrate electrode was immersed slowly into the water so as to traverse the water surface at a rate of 5 mm/min, and pulled out at the same rate to form a two-layered Y-type monomolecular built-up film (30 Å thick) on the substrate electrode 602 as the recording layer 603. Incidentally, the SOAZ was confirmed not to have photoconductivity by light irradiation.

On the recording layer 603, a six-layered monomolecular built-up film of phthalocyanine derivative (specifically tert-butyl copper phthalocyanine) was laminated as the photoconductive thin film 604 in a manner as described below.

The phthalocyanine derivative in a powdery state was dissolved in chloroform at a concentration of 0.2 mg/ml. This solution was developed over a water surface at 20° C. to form a monomolecular film on the water surface. After evaporation of the solvent, the surface pressure of the monomolecular film was raised to 20 mN/m. Then, with the surface pressure kept constant, the above substrate having the recording layer 603 and the substrate electrode 602 was immersed slowly into the water so as to traverse the water surface at a rate of 10 mm/min, and pulled out slowly at a rate of 5 mm/min to laminate a two-layered Y-type monomolecular built-up film on the substrate. This procedure was conducted three times to form a six-layered monomolecular built-up film on the substrate.

Figure 8:
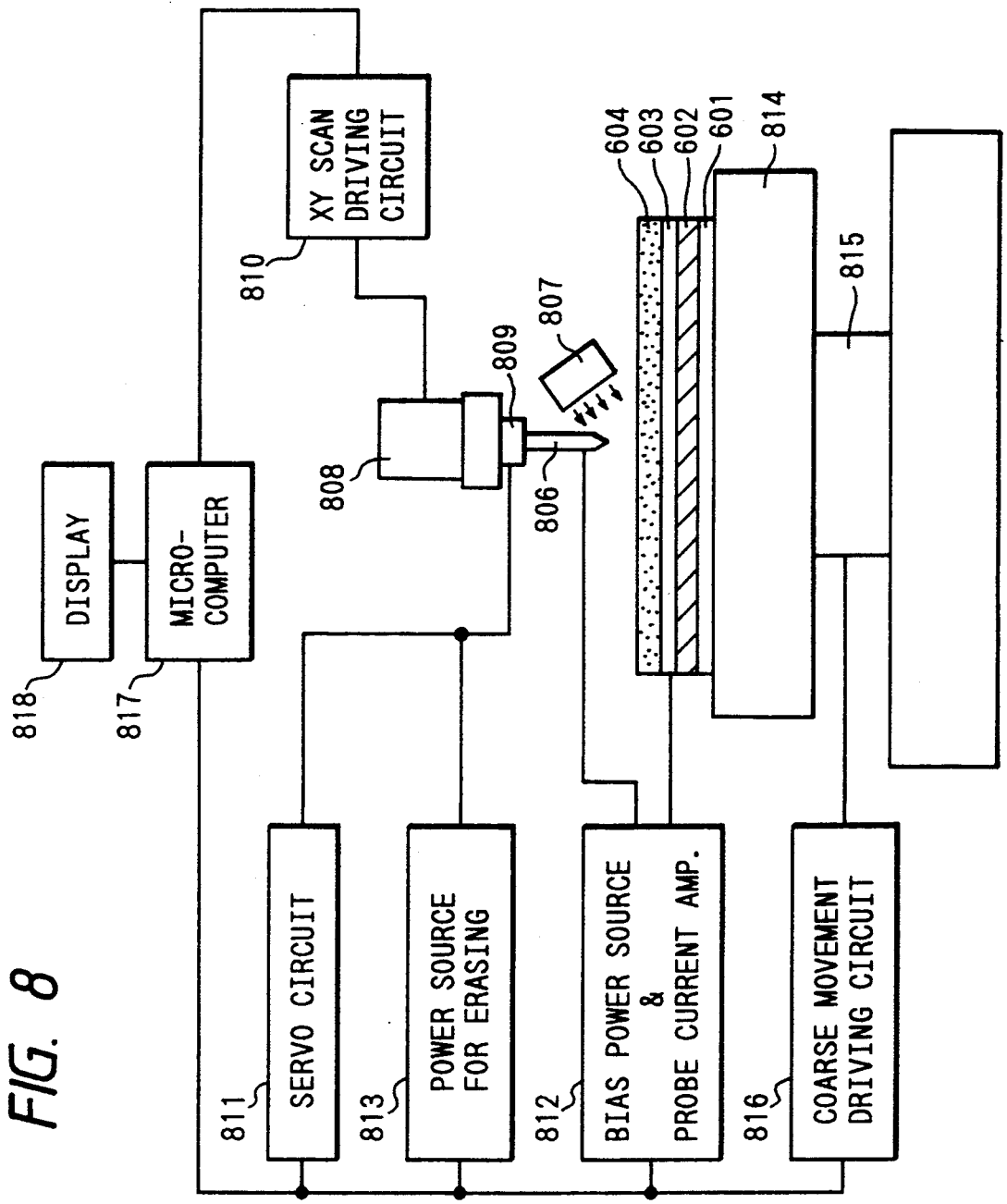
FIG. 8 is a block diagram of the constitution of an information-processing apparatus employing the second recording medium of the present invention.

Recording, reproducing, and erasing were conducted on the recording medium prepared above by means of an information-processing apparatus shown in FIG. 8. The probe electrode 806 employed is prepared from platinum/rhodium by electropolishing. This probe electrode 806 is controlled by a piezoelectric element to keep the distance (Z) from the recording layer 603 to apply voltage thereto. In addition to the above control mechanism, a fine movement control mechanism is provided to control the movement of the probe electrode 806 in a plane (XY) direction.

The probe electrode 806 is capable of conducting recording, reproducing, and erasing directly. The recording medium is placed on an XY stage 814 of high precision to be movable to desired positions. Accordingly, the recording, reproducing and erasing can be practiced with the probe electrode 806 on any desired position of the recording medium by means of this movement control mechanism.

The aforementioned recording medium, which has the recording layer 603 constituted of two SOAZ layers and the photoconductive thin film 604 constituted of six tert-butyl copper phthalocyanine layers, was set on the recording-reproducing apparatus. Then voltage of +1V was applied between the probe electrode 806 and the substrate electrode 602 of the recording medium, and the distance (Z) between the probe electrode 806 and the substrate electrode 602 was adjusted by monitoring the current flowing between the two electrodes, where the probe current $I_p$ for controlling the distance Z was within the range of $10^{-8}A \geq I_p \geq 10^{-10}A$.

Figure 9:
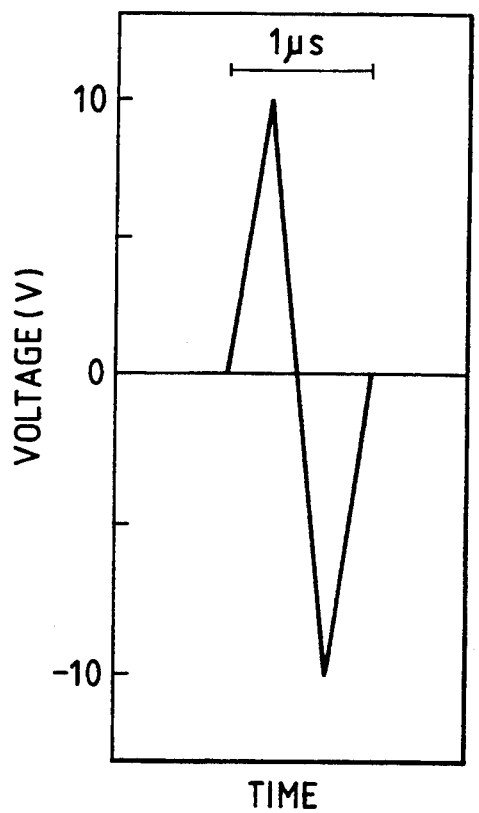
FIG. 9 shows the wave shape of the pulse signal employed in the recording on the second recording medium of the present invention.

Information was recorded at a pitch of 100 Å with the probe electrode scanning, where triangle pulse voltage which was higher than the threshold voltage $V_{th\text{-}ON}$ shown in FIG. 9 was applied by employing the probe electrode 806 as a positive electrode and the substrate electrode 602 as a negative electrode such that the electric memory material (two-layered SOAZ-LB film) changes from an initial high-resistance state (OFF state) to a low-resistance state (ON state). Thereafter the probe electrode was caused to scan the recording medium again from the starting point of the recording. Thereby, the recorded bits were shown to be in a ON state, allowing a probe current to flow at an intensity of about 0.7 mA. The above experiment shows that ultra-high density recording is practicable also in the recording medium having a photoconductive thin film and a recording layer.

The recording medium having the recorded information as above was irradiated by light having a central wavelength of 650 nm by means of a light-projection apparatus 807, and simultaneously erasing voltage (pulse voltage of wave height of 10V) was applied to the recording medium from the probe electrode. Thereafter, over the region having been subjected to the above erasing operation, reproducing operation was conducted by employing the probe electrode. The recorded bits formed above were found to have returned from the ON state to the OFF state entirely, thereby all the recorded bits being erased at one time.

The above operations of recording, reproducing, and collective erasing could be conducted repeatedly readily without damaging the recording medium.

Example 6

A substrate electrode 602 was formed on a glass substrate 601 (#7059, made by Corning Co.) in the same manner as in Example 5.

On the substrate electrode, a four-layered monomolecular built-up film of PI made from 4,4'-diaminodiphenyl ether and pyromellitic anhydride was formed by an LB method as the recording layer 603. Further thereon, an eight-layered monomolecular built-up film of PI made from 1,6-diaminocarbazole and pyromellitic anhydride was formed by an LB method as the photoconductive thin layer 604, thus a recording medium was completed. The PI of the above recording layer was tested and found to be non-photoconductive.

The resulting recording medium was tested for recording and reproducing in the same manner as in Example 5. Consequently, the recording and reproducing could be conducted in ultra-high density. The recording medium, after the recording, was tested for erasing by projecting light to the recorded region and simultaneously applying erasing voltage from the probe electrode in the same manner as in Example 5. Consequently, the recorded bits could be erased entirely at one time.

Example 7

A substrate electrode 602 was formed on a glass substrate 601 (#7059, made by Corning Co.) in the same manner as in Example 6. On the substrate electrode, a four-layered monomolecular built-up film of PI made from 4,4'-diaminodiphenyl ether and pyromellitic anhydride was formed by an LB method as the recording layer 603.

Further on the recording layer 603, a photoconductive thin film 604 was formed composed of amorphous silicon (hereinafter referred to as "a-Si:H") in a thickness of about 50 Å according to plasma CVD, thus completing a recording medium. The method of forming the a-Si:H film is described below.

The substrate having the substrate electrode and the recording layer laminated thereon was set in a vacuum chamber of a plasma CVD apparatus. Therein an a-Si:H film was formed under the conditions of the substrate temperature of 200° C., the $SiH_4$ gas flow rate of 10 sccm, the pressure of 0.4 Torr, and RF power of 4.0W.

The resulting recording medium was tested for recording and reproducing in the same manner as in Example 5. Consequently, the recording and reproducing could be conducted in ultra-high density. The recording medium, after the recording, was tested for erasing by projecting light to the recorded region and simultaneously applying erasing voltage from the probe electrode in the same manner as in Example 5. Consequently, the recorded bits could be erased entirely at one time.

As described in this Example, the four-layered LB film of PI constituted from 4,4'-diaminodiphenyl ether and pyromellitic anhydride was useful as the recording layer, and the a-Si:H film was useful as the photoconductive thin film.

In the Examples above, the light-projected region was not limited specially. To erase information on the entire recording medium, light is projected over the entire face of the recording medium with simultaneous application of erasing voltage, while, to erase information partially, light is projected only to the portion to be erased with simultaneous application of erasing voltage. To erase recorded bits one by one, traditional method of erasing is also useful. The method of applying erasing voltage is not limited to that by use of probe electrode as in Examples above. Instead, additional power source may be provided for erasing.

The recording layer was formed in Examples above by an LB method. However, any method may be applicable which enables formation of an extremely thin and uniform film, specifically including MBE, and CVD. The material and the shape of the substrate are not limited in the present invention. Further, while the probe was single in Examples above, two or more probes may be used for separate use for recording-reproducing and tracking.

Example 8

An optically polished glass substrate (Substrate 111) was washed with a neutral detergent, and trichloroethylene. On this substrate, Cr was deposited in a thickness of 30 Å as a subbing layer by vacuum vapor deposition (resistance heating). Thereon, Au was deposited in a thickness of 1000 Å as the substrate electrode 112 by the same method.

Separately, a solution of SOAZ in chloroform at a concentration of 0.2 mg/ml was developed over a water surface at 20° C. to form a monomolecular film on the water surface. After evaporation of the solvent, the surface pressure of the monomolecular film was raised to 20 mN/m. Then, with the surface pressure kept constant, the above substrate having the substrate electrode was immersed slowly into the water so as to traverse the water surface at a rate of 5 mm/min, and pulled out at the same rate to form a two-layered Y-type monomolecular built-up film (30 Å thick) on the substrate electrode 112 as the recording layer 113. Incidentally, the SOAZ was confirmed not to have photoconductivity by light irradiation.

On the recording layer 113, a six-layered monomolecular built-up film of phthalocyanine derivative (specifically tert-butyl copper phthalocyanine) was laminated as the photoconductive thin film 114 in a manner as described below.

The phthalocyanine derivative in a powdery state was dissolved in chloroform at a concentration of 0.2 mg/ml. This solution was developed over a water surface at 20° C. to form a monomolecular film on the water surface. After evaporation of the solvent, the surface pressure of the monomolecular film was raised to 20 mN/m. Then, with the surface pressure kept constant, the above substrate having the recording layer 113 and the substrate electrode 112 was immersed slowly into the water so as to traverse the water surface at a rate of 10 mm/min, and pulled out at a rate of 5 mm/min to laminate a two-layered Y-type monomolecular built-up film on the substrate. This procedure was conducted three times to form a six-layered monomolecular built-up film on the substrate.

Onto the photoconductive layer laminated on the whole face of the recording layer, an electron beam was projected at a beam diameter of 100 Å, an accelerating voltage of 100 KV, and a beam current of 5 pA, successively at a pitch of 2000 Å over a length of 1 μm laterally and vertically in a network, whereby the photoconductive layer is locally removed to form 25 sectors in an area of 1 μm square. The scanning speed was adjusted to obtain the dose rate of the electron beam of about 1 $C/cm^2$.

Figure 12:
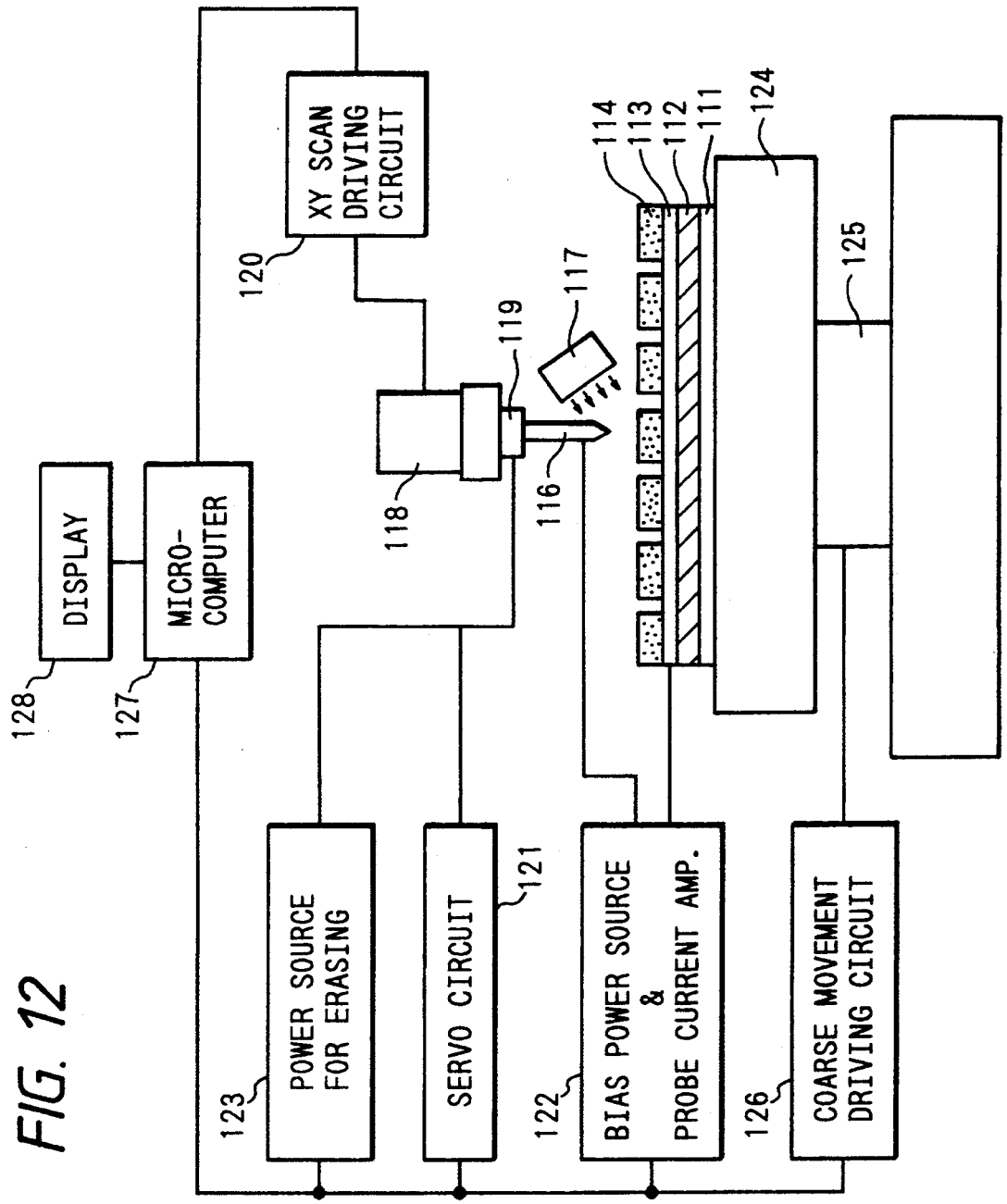
FIG. 12 is a block diagram of constitution of an information-processing apparatus employing the third recording medium of the present invention.

Recording, reproducing, and erasing were conducted on the recording medium prepared above by means of an information-processing apparatus shown in FIG. 12. The probe electrode 116 employed is prepared from platinum/rhodium by electropolishing. This probe electrode 116 is controlled in position by a piezoelectric element to keep the distance (Z) from the recording layer 113 to apply voltage thereto. In addition to the above control mechanism, a fine movement control mechanism is provided to control the movement of the probe electrode 116 in a plane (XY) direction.

The probe electrode 116 is capable of conducting recording, reproducing, and erasing directly. The recording medium is placed on an XY stage 124 of high precision to be movable to desired positions. Accordingly, the recording, reproducing and erasing can be practiced with the probe electrode 116 on any desired position of the recording medium by means of this movement control mechanism.

The aforementioned recording medium, which has the recording layer 113 constituted of two SOAZ layers and the photoconductive thin layer 114 constituted of six tert-butyl copper phthalocyanine layers, was set on the recording-reproducing apparatus. Then voltage of +1V was applied between the probe electrode 116 and the substrate electrode 112 of the recording medium, and the distance (Z) between the probe electrode 116 and the substrate electrode 112 was adjusted by monitoring the current flowing between the two electrodes, where the probe curant $I_p$ for controlling the distance Z was within the range of $10^{-8} A \geq I_p \geq 10^{-10} A$.

The probe electrode was made to scan by applying reading-voltage of 0.5V which is below the threshold voltage for causing an electric memory effect between the probe electrode and the substrate electrode. Over the entire scanned range, the current detected between the two electrodes was not more than 1 μA, which shows the OFF state. Into a first sector, information was recorded at a pitch of 100 Å with the probe electrode scanning, where triangle pulse voltage which is higher than the threshold voltage $V_{th-ON}$ shown in FIG. 4 was applied by employing the probe electrode 116 as a positive electrode and the substrate electrode 112 as a negative electrode such that the electric memory material (two-layered SOAZ-LB film) changes from an initial high-resistance state (OFF state) to a low-resistance state (ON state). During the application of the pulse voltage, the output voltage of the servo circuit was kept constant. Thereafter the probe electrode was caused to scan the recording medium again from the starting point of the recording with application of reading voltage of 0.5V. Thereby, the recorded bits were shown to be in an ON state, allowing a probe current to flow at an intensity of about 0.3 mA. The above experiment shows that ultra-high density recording is practicable also in the recording medium having a photoconductive thin film and a recording layer. In a second sector also, recording-reproducing of information was conducted and accomplishment of recording was confirmed.

The recording medium having the recorded information as above was irradiated over the whole face by light having a central wavelength of 650 nm by means of a light-projection apparatus 117, and simultaneously erasing voltage (see FIG. 5) was applied to the first sector of the recording medium from the probe electrode. Thereafter, reproducing operation was conducted over the region in the first sector having been subjected to the above erasing operation, by scanning the probe electrode. The recorded bits having been formed above were found to have returned from the ON state to the OFF state entirely (the probe current being not more than 1 μA), thereby all the recorded bits in the first sector being erased at one time. In the second sector, reproducing was conducted by scanning the probe electrode, and was found that the recorded bits were kept in an ON state (the prove current being 0.3 mA) without being erased. Accordingly, recorded information only in the desired sectors can be erased according to the present invention.

The above operations of recording, reproducing, and collective erasing could be conducted repeatedly readily without damaging the recording medium.

Example 9

A substrate electrode 112 was formed on a glass substrate 111 (#7059, made by Corning Co.) in the same manner as in Example 8.

On the substrate electrode, a four-layered monomolecular built-up film of PI made from 4,4'-diaminodiphenyl ether and pyromellitic anhydride was formed by an LB method as the recording layer 113. Further thereon, an eight-layered monomolecular built-up film of PI made from 1,6-diaminocarbazole and pyromellitic anhydride was formed by an LB method as the photoconductive thin layer 114. Then a recording medium having separated sectors was prepared by electron beam irradiation in the same manner as in Example 8. The PI of the above recording layer was tested and found to be non-photoconductive.

The resulting recording medium was tested for recording and reproducing in the same manner as in Example 8. Consequently, the recording and reproducing could be conducted in ultra-high density. The recording medium, after the recording, was tested for erasing by projecting light to the recorded sector region and simultaneously applying erasing voltage from the probe electrode in the same manner as in Example 8. Consequently, the recorded bits in the desired sectors only could be erased entirely at one time.

Example 10

A substrate electrode 112 was formed on a glass substrate 111 (#7059, made by Corning Co.) in the same manner as in Example 9. On the substrate electrode, a four-layered monomolecular built-up film of PI made from 4,4'-diaminodiphenyl ether and pyromellitic anhydride was formed by an LB method as the recording layer 113.

On this PI recording layer, a negative type of resist material (Trade name: RD-2000N-10) was applied by spinner coating, and the coating was prebaked. In this step, a resist pattern was formed such that isolated photoconductive layer sectors in size of 1 μm were formed in a grid-dot pattern at intervals of 0.7 μm.

On the substrate, a photoconductive layer 114 was formed which was composed of a-Si:H in a thickness of about 50 Å according to plasma CVD. The method of forming the a-Si:H film is described below.

The substrate having the recording layer and the substrate electrode laminated thereon was set in a vacuum chamber of a plasma CVD apparatus. Therein an a-Si:H film was formed under the conditions of the substrate temperature of 200° C., the $SiH_4$ gas flow rate of 10 sccm, the pressure of 0.4 Tort, and the RF power of 4.0W.

The substrate was then subjected to an acetone-ultrasonic treatment, a DMF-ultrasonic treatment, purewater washing, and baking, and a plurality of isolated sectors of photoconductive layer in a size of 1 μm were formed by a lift-off method. Thus a recording medium was completed.

The resulting recording medium was tested for recording and reproducing in the same manner as in Example 8. Consequently, the recording and reproducing could be conducted in ultra-high density. The recording medium, after the recording, was tested for erasing by projecting light to the recorded region and simultaneously applying erasing voltage from the probe electrode in the same manner as in Example 8. Consequently, the recorded bits in intended sectors only could be erased entirely at one time.

Thus the four-layered LB film of PI constituted from 4,4'-diaminodiphenyl ether and pyromellitic anhydride was useful as the recording layer, and a-Si:H film was useful as the photoconductive thin film in the present invention.

In the Examples 8 to 10, no limitation was made regarding the light-projected region specially. The light has only to be projected to the regions covering all the photoconductive layer sectors to be erased. The light may be projected over the entire face of the recording medium with simultaneous application of erasing voltage, while, to erase information partially, light may be projected only to the portion to be erased with simultaneous application of erasing voltage. To erase recorded bits one by one, traditional method of erasing is also useful. The method of applying erasing voltage is not limited to that by use of probe electrode as in Examples above. Instead, additional power source may be provided for erasing.

The recording layer was formed in Examples above by an LB method. However, any film forming method may be applicable which enables formation of an extremely thin and uniform film, specifically including MBE, and CVD. The material and the shape of the substrate are not limited in the present invention. Further, while the probe was single in Examples above, two or more probes may be used for separate use for recording-reproducing and tracking.

As described above, the first recording medium of the present invention enables recording in much higher density and can be produced easier than light-recording medium. In this recording medium, the tracks and the recorded portions are easily discriminated in recording, reproducing and erasing, and reading error rate is low in reproducing.

In the second recording medium of the present invention, ultra-high density recording is practicable, and the recorded information at a desired region or over the entire face can be erased readily at one time.

In the third recording medium of the present invention, ultra-high density recording is practicable, and the recorded information at a desired sector only can be erased readily and selectively at one time.

What is claimed is:

1. A recording medium comprising a substrate electrode, a recording layer having an electric memory effect provided on said electrode and constituted of a monomolecular film of an organic compound or a built-up film thereof, and a photoconductive thin film laminated on said recording layer, said photoconductive thin film being divided into a plurality of isolated sectors.

2. The recording medium of claim 1, wherein said organic compound possesses both a group having a $\pi$-electron level and a group having a $\sigma$-electron level.

3. The recording medium of claim 1, wherein said recording layer and said photoconductive thin film are formed of different materials from each other.

4. The recording medium of claim 1, wherein said recording layer and photoconductive thin film has a combined thickness of 5 to 100 Å.

5. The recording medium of claim 1, wherein said recording layer and photoconductive thin film has a combined thickness of 5 to 30 Å.

6. The recording medium of claim 1, wherein said photoconductive thin film is constituted of a monomolecular film of an organic compound or a built-up film thereof.

7. An information erasing method for erasing information written in a recording medium as defined in any of claims 1, 2, 3, 4, 5 or 6 comprising the steps of disposing said medium close to a probe electrode and facing toward a light source, and applying a voltage to said medium under light irradiation.

8. An information erasing method for erasing information written in a recording medium comprising a substrate electrode, a recording layer provided thereon and constituted of a monomolecular film of an organic compound or a built-up film thereof, and a photoconductive thin film laminated on said recording layer, said photoconductive thin film being divided into a plurality of isolated sectors, the information being written in a portion of said plurality of sectors, which method comprises a first step of disposing said medium close to a probe electrode and facing toward a light source, a second step of irradiating selectively said portion, and a third step of applying a voltage between said thin film and said probe electrode.

9. The method of claim 8, wherein said voltage is a pulse voltage.

10. The method of claim 8, wherein said second step is conducted substantially simultaneously with said third step.

11. A recording medium comprising a substrate; a substrate electrode layer; and a recording layer on said substrate electrode layer, said recording layer comprising a first layer and a second layer; said first layer comprising a track region and an adjacent non-track region; and said second layer having a recording region laminated on said first layer.

12. The recording medium of claim 11, wherein said track region is discriminated as having a different electroconductivity from that of the adjacent non-track region.

13. The method of claim 7, wherein said voltage is a pulse voltage.

* * * * *

UNITED STATES PATENT AND TRADEMARK OFFICE
CERTIFICATE OF CORRECTION

PATENT NO. : 5,389,475   Page 1 of 3
DATED : February 14, 1995
INVENTOR(S) : Yanagisawa et al.

It is certified that error appears in the above-indentified patent and that said Letters Patent is hereby corrected as shown below:

COLUMN 1:

Line 35, "526" should read --726--.

COLUMN 4:

Line 64, "obtained" should read --obtained in--.

COLUMN 5:

Line 22, "material" should read --materials--;
Line 27, "E-electron" should read --π-electron--;
Line 28, "u-electron" should read --σ-electron--; and
Line 35, "X-electron" should read --π-electron--.

COLUMN 6:

Line 2, "bezoxazole" should read --benzoxazole--; and
Line 36, "E-electron" should read --π-electron--.

COLUMN 7:

Form 11, " 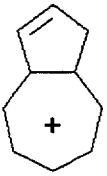 " should read -- 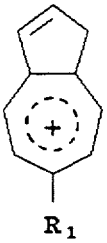 --.

UNITED STATES PATENT AND TRADEMARK OFFICE
CERTIFICATE OF CORRECTION

PATENT NO. : 5,389,475
DATED : February 14, 1995
INVENTOR(S) : Yanagisawa et al.

It is certified that error appears in the above-indentified patent and that said Letters Patent is hereby corrected as shown below:

COLUMN 9:

Line 2, "II]" should read --[II]--.

COLUMN 13:

Line 41, "Pt-It," should read --Pt-Ir,--.

COLUMN 16:

Line 26, "in" should read --in the--; and
Line 67, "A1," should read --Al,--

COLUMN 17:

Line 32, "device 80?" should read --device 807--.

COLUMN 18:

Line 36, "close sufficiently" should read --sufficiently close--.

COLUMN 20:

Line 23, "CF layer" should read --Cr layer--.

UNITED STATES PATENT AND TRADEMARK OFFICE
CERTIFICATE OF CORRECTION

PATENT NO. : 5,389,475
DATED : February 14, 1995
INVENTOR(S) : Yanagisawa et al.

It is certified that error appears in the above-indentified patent and that said Letters Patent is hereby corrected as shown below:

COLUMN 22:

Line 35, "1.0 mmol/$\Omega$" should read --1.0 mmol/$\ell$--.

COLUMN 24:

Line 66, "a" should read --an--.

COLUMN 28:

Line 25, "prove" should read --probe--.

COLUMN 29:

Line 15, "0.4 Tort," should read --0.4 Torr,--.

Signed and Sealed this

Twenty-third Day of May, 1995

Attest:

BRUCE LEHMAN

*Attesting Officer*    *Commissioner of Patents and Trademarks*